United States Patent
Zhou

(10) Patent No.: US 9,609,333 B2
(45) Date of Patent: *Mar. 28, 2017

(54) PARSING FRIENDLY AND ERROR RESILIENT MERGE FLAG CODING IN VIDEO CODING

(71) Applicant: TEXAS INSTRUMENTS INCORPORATED, Dallas, TX (US)

(72) Inventor: Minhua Zhou, San Diego, CA (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 58 days.

This patent is subject to a terminal disclaimer.

(21) Appl. No.: 14/687,639

(22) Filed: Apr. 15, 2015

(65) Prior Publication Data

US 2015/0222904 A1 Aug. 6, 2015

Related U.S. Application Data

(63) Continuation of application No. 13/412,045, filed on Mar. 5, 2012, now Pat. No. 9,066,110.

(Continued)

(51) Int. Cl.
*H04N 19/139* (2014.01)
*H04N 19/52* (2014.01)
(Continued)

(52) U.S. Cl.
CPC ......... *H04N 19/139* (2014.11); *H04N 19/105* (2014.11); *H04N 19/124* (2014.11);
(Continued)

(58) Field of Classification Search
CPC .................................................. H04N 19/139
(Continued)

(56) References Cited

U.S. PATENT DOCUMENTS 5,418,570 A * 5/1995 Ueno .................. H04N 19/105
348/699
2008/0123947 A1 5/2008 Moriya et al.
(Continued)

FOREIGN PATENT DOCUMENTS

WO WO 2011021915 2/2011

OTHER PUBLICATIONS

S. Oudin et al, "Block Merging for Quadtree-Based Video Coding", Fraunhofer Heinrich Hertz Institute, VDE ITG 3.2, Aachen, Germany, Jul. 8, 2011, pp. 1-22.

(Continued)

*Primary Examiner* — Gims Philippe
*Assistant Examiner* — Jonathan Messmore
(74) *Attorney, Agent, or Firm* — Peter K. McLarty; Charles A. Brill; Frank D. Cimino

(57) ABSTRACT

Methods and apparatus for parsing friendly and error resilient merge flag coding in video coding are provided. In some methods, in contrast to merging candidate list size dependent coding of the merge flag in the prior art, a merge flag is always encoded in the encoded bit stream for each inter-predicted prediction unit (PU) that is not encoded using skip mode. In some methods, in contrast to the prior art that allowed the merging candidate list to be empty, one or more zero motion vector merging candidates formatted according to the prediction type of the slice containing a PU are added to the merging candidate list if needed to ensure that the list is not empty and/or to ensure that the list contains a maximum number of merging candidates.

18 Claims, 6 Drawing Sheets

Related U.S. Application Data

(60) Provisional application No. 61/450,242, filed on Mar. 8, 2011.

(51) Int. Cl.

| | | |
|---|---|---|
| *H04N 19/70* | (2014.01) | |
| *H04N 19/61* | (2014.01) | |
| *H04N 19/105* | (2014.01) | |
| *H04N 19/124* | (2014.01) | |
| *H04N 19/13* | (2014.01) | |
| *H04N 19/159* | (2014.01) | |
| *H04N 19/513* | (2014.01) | |
| *H04N 19/577* | (2014.01) | |

(52) U.S. Cl.
CPC ........... *H04N 19/13* (2014.11); *H04N 19/159* (2014.11); *H04N 19/52* (2014.11); *H04N 19/521* (2014.11); *H04N 19/577* (2014.11); *H04N 19/61* (2014.11); *H04N 19/70* (2014.11)

(58) Field of Classification Search
USPC .................................................. 375/240.15
See application file for complete search history.

(56) References Cited

U.S. PATENT DOCUMENTS

| | | |
|---|---|---|
| 2010/0239002 A1 | 9/2010 | Park et al. |
| 2012/0134415 A1 | 5/2012 | Lin et al. |
| 2012/0155549 A1 | 6/2012 | Oh |
| 2012/0195368 A1 | 8/2012 | Chien et al. |
| 2012/0219063 A1 | 8/2012 | Kim et al. |
| 2012/0263235 A1 | 10/2012 | Sugio et al. |
| 2012/0300846 A1 | 11/2012 | Sugio et al. |
| 2012/0307902 A1 | 12/2012 | Sugio et al. |
| 2012/0307903 A1 | 12/2012 | Sugio et al. |
| 2012/0328021 A1 | 12/2012 | Sugio et al. |
| 2013/0010869 A1 | 1/2013 | Sugio et al. |

OTHER PUBLICATIONS

Detlev Marpe et al, "Video Compression Using Nested Quadtree Structures, Leaf Merging and Improved Techniques for Motion Representation and Entropy Coding", IEEE Transactions on Circuits and Systems for Video Technology, vol. 20, Issue 12, Dec. 2010, pp. 1676-1687.

O. Le Meur, "Video Compression Beyond H.264, HEVC", Nov. 7, 2011, University of Rennes 1, France, pp. 1-65.

Minhua Zhou and Vivienne Sze, "A Study on HM2.0 Bitstream Parsing and Error Resiliency Issue", JVTVC-E118 presentation, Joint Collaborative Team on Video Coding (JCT-VC) of ITU-T, G16 WP3 and ISO/IEC JTC1/SC29/WG11, Geneva, Switzerland, Mar. 16-23, 2011, pp. 1-12.

Minhua Zhou and Vivienne Sze, "A Study on HM2.0 Bitstream Parsing and Error Resiliency Issue", JCTVC-E0118, WG11 No. m19633, Joint Collaborative Team on Video Coding (JCT-VC) of ITU-T, G16 WP3 and ISO/IEC JTC1/SC29/WG11, Geneva, Switzerland, Mar. 16-23, 2011, pp. 1-8.

Thomas Wiegand et al, "WD2: Working Draft 2 of High-Efficiency Video Coding", JCTVC-D503, Joint Collaborative Team on Video Coding (JCT-VC) of ITU-T, G16 WP3 and ISO/IEC JTC1/SC29/WG11, Daegu, Korea, Jan. 20-28, 2011, pp. 1-153.

Ken McCann et al, "High Efficiency Video Coding (HEVC) Test Model 2 (HM2) Encoder Description", JCTVC-D502, WG11 No. N11818, Joint Collaborative Team on Video Coding (JCT-VC) of ITU-T, G16 WP3 and ISO/IEC JTC1/SC29/WG11, Guangzhou, China, Oct. 7-15, 2010, pp. 1-26.

Yoshinori Suzuki, "CE9: 3.1 PU Merge & Skip Tools and Proposed Improvements", JCTVC-D233r1, WG11 No. m18993, Joint Collaborative Team on Video Coding (JCT-VC) of ITU-T, G16 WP3 and ISO/IEC JTC1/SC29/WG11, Daugu, Korea, Jan. 20-28, 2011, pp. 1-7.

Yunfei Zheng et al, "CE9 (UNI03): Unified Merge and AMVP Candidates Selection", JCTVC-F297 presentation, Joint Collaborative Team on Video Coding (JCT-VC) of ITU-T, G16 WP3 and ISO/IEC JTC1/SC29/WG11, Torino, Italy, Jul. 14-22, 2011, pp. 1-7.

Yunfei Zheng et al, "CE9: Unified Merge and AMVP Candidates Selection (UNI03)", JCTVC-F297, Joint Collaborative Team on Video Coding (JCT-VC) of ITU-T, G16 WP3 and ISO/IEC JTC1/SC29/WG11, Torino, Italy, Jul. 14-22, 2011, pp. 1-11.

Ken McCann et al, "HM3: High Efficiency Video Coding (HEVC) Test Model 3 Encoder Description", JCTVC-E602, WG11 No. N20270, Joint Collaborative Team on Video Coding (JCT-VC) of ITU-T, G16 WP3 and ISO/IEC JTC1/SC29/WG11, Geneva, Switzerland, Mar. 16-23, 2011, pp. 1-34.

Bin Li et al, "On Merge Candidate Construction", JCTVC-E146, Joint Collaborative Team on Video Coding (JCT-VC) of ITU-T, G16 WP3 and ISO/IEC JTC1/SC29/WG11, Geneva, Switzerland, Mar. 16-23, 2011, pp. 1-5.

Benjamin Bross et al, "High Efficiency Video Coding (HEVC) Text Specification Draft 6", JCTVC-H1003, Joint Collaborative Team on Video Coding (JCT-VC) of ITU-T, G16 WP3 and ISO/IEC JTC1/SC29/WG11, Geneva, Switzerland, Nov. 21-30, 2011, pp. 1-259.

\* cited by examiner

US 9,609,333 B2

PARSING FRIENDLY AND ERROR RESILIENT MERGE FLAG CODING IN VIDEO CODING

CROSS-REFERENCE TO RELATED APPLICATIONS

This application is a continuation of application Ser. No. 13/412,045, filed Mar. 5, 2012 which claims the benefit of U.S. Provisional Patent Application Ser. No. 61/450,242, filed Mar. 8, 2011, which are incorporated herein by reference in its entirety.

BACKGROUND OF THE INVENTION

Field of the Invention

Embodiments of the present invention generally relate to merge flag coding in video coding.

Description of the Related Art

Video compression, i.e., video coding, is an essential enabler for digital video products as it enables the storage and transmission of digital video. In general, video compression techniques apply prediction, transformation, quantization, and entropy coding to sequential blocks of pixels in a video sequence to compress, i.e., encode, the video sequence. Video decompression techniques generally perform the inverse of these operations in reverse order to decompress, i.e., decode, a compressed video sequence.

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). HEVC is expected to provide around 50% improvement in coding efficiency over the current standard, H.264/AVC, as well as larger resolutions and higher frame rates. Several coding efficiency enhancement tools are proposed in HEVC, among them a merge mode designed to reduce coding overhead by allowing a prediction unit (PU) to inherit motion vectors, prediction direction, and reference picture indices from selected neighboring PUs and a temporally co-located PU. While the merge mode as currently specified, i.e., as implemented in HEVC test model 2.0 (HM2.0), does reduce coding overhead, additional improvements are desirable.

SUMMARY

Embodiments of the present invention relate to methods and apparatus for merge flag coding in video coding. In one aspect, a method for decoding an encoded video bit stream in a video decoder is provided that includes decoding a merge flag for a inter-predicted prediction unit (PU) from the encoded bit stream and reconstructing the inter-predicted PU based on a value of the merge flag, wherein a merge flag is always encoded in the encoded bit stream for each inter-predicted PU that is not encoded using skip mode.

In one aspect, a method for encoding a video stream in a video encoder to generate an encoded bit stream is provided that includes determining whether or not merge mode is to be used for inter-prediction of a prediction unit (PU), and encoding a merge flag for the PU in the encoded bit stream, wherein the merge flag is set to a value indicating merge mode if merge mode is used for inter-prediction of the PU and the merge flag is set to a value indicating no merge mode if merge mode is not used for inter-prediction of the PU, wherein a merge flag is always encoded in the encoded bit stream for each inter-predicted PU that is not encoded using skip mode.

In one aspect, a method for decoding an encoded video bit stream in a video decoder is provided that includes decoding a merge flag for a inter-predicted prediction unit (PU) from the encoded bit stream, constructing a merging candidate list for the inter-predicted PU, wherein a zero motion vector merging candidate is added to the merging candidate list, wherein content of the zero motion vector merging candidate is determined based on a prediction type of a slice containing the inter-predicted PU, and reconstructing the inter-predicted PU based on a value of the merge flag.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Figure 1:
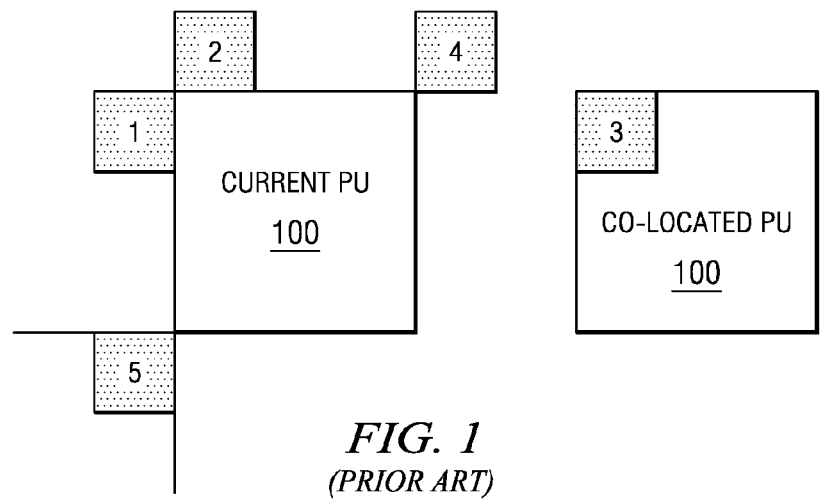
FIG. 1 shows an example of prior art candidate prediction units (PUs) for merge mode.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments of the invention are described herein in reference to HEVC. One of ordinary skill in the art will understand that embodiments of the invention are not limited to HEVC. In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted.

The coding node is the root node of two trees, a prediction tree and a transform tree. A prediction tree specifies the position and size of prediction units (PU) for a coding unit. A PU is the basic unit for carrying the information related to the prediction processes such as inter and intra-prediction. In general, a PU is not restricted to a square shape in order to facilitate partitioning that matches boundaries of real objects in a picture. A CU may be partitioned into one or more PUs. A transform tree specifies the position and size of transform units (TU) for a coding unit. A transform unit may not be larger than a coding unit. The sizes of the transforms units and prediction units for a CU are determined by the video encoder during prediction based on minimization of rate/distortion costs.

Some aspects of this disclosure have been presented to the JCT-VC in the following document: JCTVC-E0118, entitled "A Study on HM2.0 Bitstream Parsing and Error Resiliency Issue", Mar. 16-23, 2011, which is incorporated by reference herein in its entirety.

As previously discussed, merge mode is a new coding tool proposed in HEVC. A general description of the HM2.0 merge mode is provided herein. A more detailed description is found in K. McCann, et al., "High Efficiency Video Coding (HEVC) Test Model 2 (HM 2) Encoder Description," JCTVC-D502, Joint Collaborative Team on Video Coding (JCT-VC) of ITU-T SG16 WP3 and ISO/IEC JTC1/SC29/WG11, Guangzhou, CN, Oct. 7-15, 2010, and T. Wiegand, et al., "WD2: Working Draft 2 of High-Efficiency Video Coding," JCTVC-D503, Joint Collaborative Team on Video Coding (JCT-VC) of ITU-T SG16 WP3 and ISO/IEC JTC1/SC29/WG11, Daegu, Korea, Jan. 20-28, 2011 ("WD2"), both of which are incorporated by reference herein.

In general, merge mode in HM2.0 allows the encoder to "merge" an inter-predicted PU with a PU selected from a group of spatially neighboring PUs and a temporally co-located PU in that the PU uses the same motion vector(s), prediction direction, and reference picture(s) as one of the PUs in the group. FIG. 1 illustrates candidate PUs for the merge mode as defined in HM2.0 and WD2.

For the current PU 100, the encoder forms a merging candidate list by considering the five candidate PUs depicted in FIG. 1: four spatially neighboring PUs, i.e., a left neighboring PU, an upper neighboring PU, an upper right neighboring PU, and a bottom left neighboring PU, and a temporally co-located PU 102. The merging candidates in the list, if available, are ordered in the merging candidate list as numbered in FIG. 1, with the merging candidate from the left neighboring PU placed at the beginning of the list, and that of the bottom-left neighboring PU placed at the end of the list. The derivation of the spatially neighboring PU candidates and of the temporally co-located PU 102 and the criteria for availability of a PU are explained in WD2.

A merging candidate includes motion vector information, prediction flag information, and reference picture index information for a candidate PU. A merging candidate may include sufficient entries to accommodate a bi-directionally predicted PU, i.e., entries for a forward motion vector, a backward motion vector, a forward reference picture index, a backward reference picture index, and a prediction flag indicating prediction direction, i.e., forward, backward, or bi-directional. The prediction flag may be composed of two prediction list utilization flags used to indicate which of two reference picture lists is to be used. Each reference picture index is an index into a respective one of the reference picture lists. For a forward predicted PU, the merging candidate entries for the prediction flag, the forward motion vector, and the forward reference picture index will be valid and the remaining entries may have placeholder values. For a backward predicted PU, the merging candidate entries for the prediction flag, the backward motion vector, and the backward reference picture index will be valid and the remaining entries may have placeholder values. For a bi-directionally predicted PU, all merging candidate entries will be valid.

In HEVC, the merging candidate entries may be referred to according to their correspondence with one of two reference picture lists, list 0 and list 1. Thus, the forward motion vector may be referred to as the list 0 (or L0) motion vector, the backward motion vector may be referred to as the list 1 (or L1) motion vector, the two prediction list utilization flags be referred to as the list 0 (or L0) prediction list utilization flag and the list 1 (or L1) prediction list utilization flag, and the reference picture indices may be referred to as the list 0 (or L0) reference picture index and the list 1 (or L1) reference picture index.

After the merging candidate list is formed, a pruning process is carried out to remove any duplicated merging candidates. If two or more merging candidates have the same motion vector(s), prediction direction, and reference picture index (or indices), the lowest order duplicated merging candidate is retained in the list and the others are removed. The size of the merging candidate list can be zero if all the spatially neighboring PUs and temporally co-located PU are invalid candidates for the merge mode. Invalidity of a candidate PU for merge mode is explained in WD2.

If the merging candidate list is not empty, the encoder considers the merging candidates in the list along with direct inter-prediction of a PU to decide whether to merge the PU with one of the candidate PUs in the list or to directly inter-predict the PU. In general, for direct or normal inter-prediction, motion vector(s) of a PU is (are) predicatively coded relative to a motion vector predictor(s) (MVP(s)) from an advanced motion vector predictor (AMVP) candidate list constructed by the encoder. Normal inter-prediction and construction of the AMVP candidate list is explained in detail in WD2.

The encoder encodes a merge flag into the bit stream to signal whether or not the merge mode is used for the current PU, so that the decoder knows whether or not to inherit the motion data (motion vectors, prediction direction, and reference picture index (or indices)) from spatially neighboring PUs and the temporally co-located PU for motion compensation. If merge mode is used, the encoder also encodes the index in the merging candidate list of the merging candidate selected for merging (unless there is only one entry in the list). If merge mode is not used, the encoder encodes the normal inter-prediction information for the PU in the bitstream such as an index into the AMVP candidate list, prediction direction, motion vector differences (MVDs), and the reference picture index (or indices). If the merging candidate list is empty, the encoder does not encode the merge flag. In other words, the transmission of the merge flag is conditional in HM2.0 in that the merge flag is coded in the bit stream only if the merging candidate list size is larger than zero.

Figure 2:
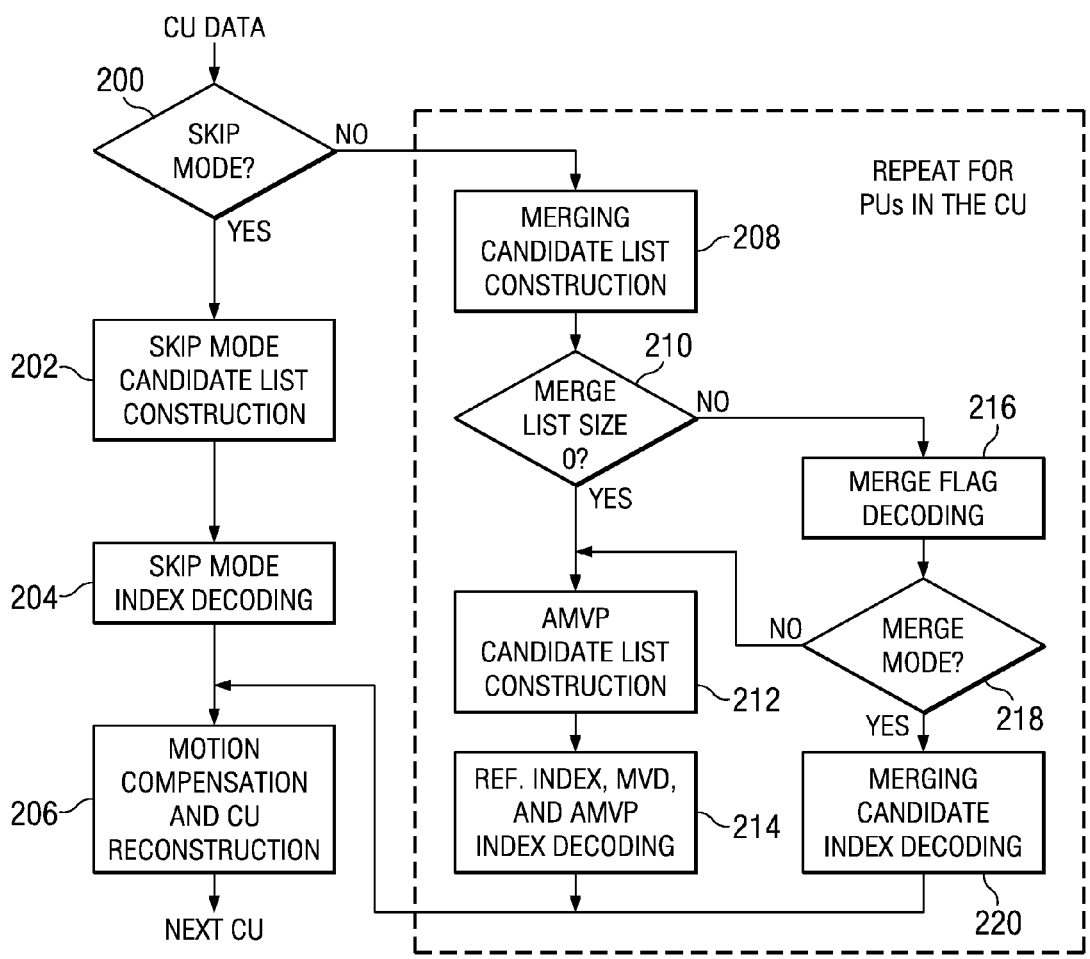
FIG. 2 is a block diagram illustrating decoding an inter-predicted coding unit (CU) in a prior art version of HEVC.

Because the coding of the merge flag is dependent on the size of the merging candidate list, the decoder is required to reconstruct the merging candidate list before determining whether or not merge mode was used by the encoder. FIG. 2 illustrates decoding of an inter-predicted CU in HM2.0. If skip mode is signaled 200 for a CU, the decoder constructs 202 a skip mode candidate list, decodes 204 the skip mode candidate index, and performs the normal motion compensation and CU reconstruction 206 using the indicated skip mode candidate from the skip mode candidate list.

If skip mode is not signaled 200 for the CU, then the operations in the dotted box are repeated for each PU in the CU. First, the merging candidate list is constructed 208 for the PU using the same candidate PUs and construction criteria as the encoder. Once the merging candidate list is constructed, the merge flag is decoded 216 if the size of the merging candidate list is not zero 210. Otherwise, the AMVP candidate list is constructed 212, the reference picture index (or indices), MVDs, and AMVP candidate list index are decoded 214, and motion compensation and reconstruction are performed 206 on the PU using this information.

If the merge flag is decoded 216, and the merge flag indicates that merge mode was not used 218, then the AMVP candidate list is constructed 212, the reference picture index (or indices), MVDs, and the AMVP candidate list index are decoded 214 from the bit stream, and motion compensation and reconstruction are performed 206 on the PU using this information. If the decoded merge flag indicates that merge mode was used 218, then the merging candidate index is decoded 220, and motion compensation and reconstruction are performed 206 using the indicated merging candidate from the merging candidate list.

As can be seen from FIG. 2, the merging candidate list size dependent merge flag coding creates a lot of overhead in the decoder for bit stream parsing as the merging candidate list must be constructed even if merge mode is not used. Also, the merging candidate list size dependent merge flag coding makes the bit stream parsing sensitive to errors as any corruption in the motion information (e.g., motion vectors) may lead to incorrect construction of the merging candidate list, which may then cause incorrect decoding of the merge flag.

Embodiments of the invention provide for decoupling the encoding of the merge flag from the size of the merging candidate list such that a merge flag is always encoded for each inter-predicted PU that is not encoded using skip mode. As a result, parsing of the merge flag in a decoder may be independent of the construction of the merging candidate list, making the parsing of the encoded bit stream more error resilient and allowing for a reduction in the overhead needed to parse the bit stream. Further, embodiments of the invention guarantee that the merging candidate list is never empty. In some embodiments, a zero motion vector merging candidate is added to the merging candidate list if it is empty after all candidate PUs are considered. In some embodiments, rules are provided for slice type dependent formatting of zero motion vector merging candidates added to the merging candidate list.

Figure 3:
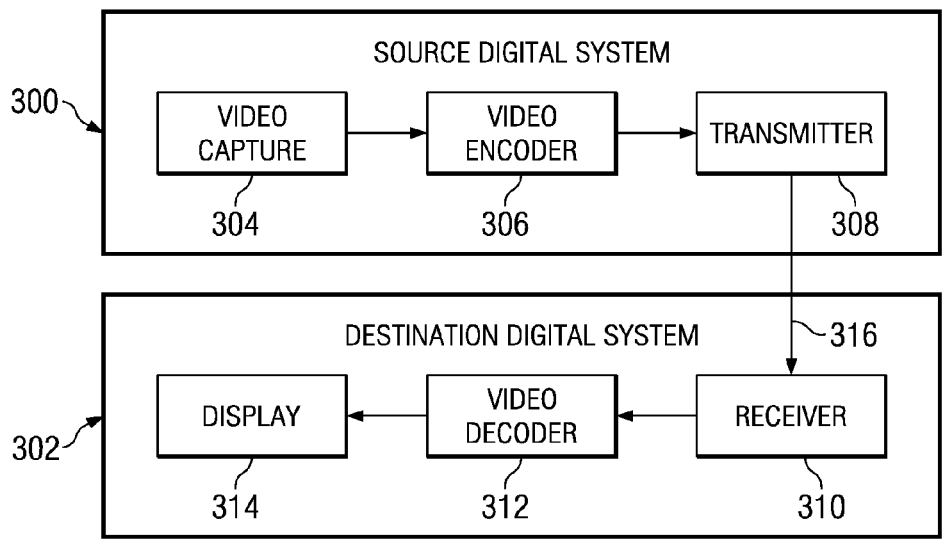
FIG. 3 is a block diagram of a digital system.

FIG. 3 shows a block diagram of a digital system that includes a source digital system 300 that transmits encoded video sequences to a destination digital system 302 via a communication channel 316. The source digital system 300 includes a video capture component 304, a video encoder component 306, and a transmitter component 308. The video capture component 304 is configured to provide a video sequence to be encoded by the video encoder component 306. The video capture component 304 may be, for example, a video camera, a video archive, or a video feed from a video content provider. In some embodiments, the video capture component 304 may generate computer graphics as the video sequence, or a combination of live video, archived video, and/or computer-generated video.

The video encoder component 306 receives a video sequence from the video capture component 304 and encodes it for transmission by the transmitter component 308. The video encoder component 306 receives the video sequence from the video capture component 304 as a sequence of pictures, divides the pictures into largest coding units (LCUs), and encodes the video data in the LCUs. The video encoder component 306 may be configured to perform merging candidate list construction and merge flag coding during the encoding process as described herein. An example of the video encoder component 306 is described in more detail herein in reference to FIG. 4.

The transmitter component 308 transmits the encoded video data to the destination digital system 302 via the communication channel 316. The communication channel 316 may be any communication medium, or combination of communication media suitable for transmission of the encoded video sequence, such as, for example, wired or wireless communication media, a local area network, or a wide area network.

The destination digital system 302 includes a receiver component 310, a video decoder component 312 and a display component 314. The receiver component 310 receives the encoded video data from the source digital system 300 via the communication channel 316 and provides the encoded video data to the video decoder component 312 for decoding. The video decoder component 312 reverses the encoding process performed by the video encoder component 306 to reconstruct the LCUs of the video sequence. The video decoder component 312 may be configured to construct a merging candidate list and decode a merge flag during the decoding process as described herein. An example of the video decoder component 312 is described in more detail below in reference to FIG. 5.

The reconstructed video sequence is displayed on the display component 314. The display component 314 may be any suitable display device such as, for example, a plasma display, a liquid crystal display (LCD), a light emitting diode (LED) display, etc.

In some embodiments, the source digital system 300 may also include a receiver component and a video decoder component and/or the destination digital system 302 may include a transmitter component and a video encoder component for transmission of video sequences both directions for video steaming, video broadcasting, and video telephony. Further, the video encoder component 306 and the video decoder component 312 may perform encoding and decoding in accordance with one or more video compression standards. The video encoder component 306 and the video decoder component 312 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 4:
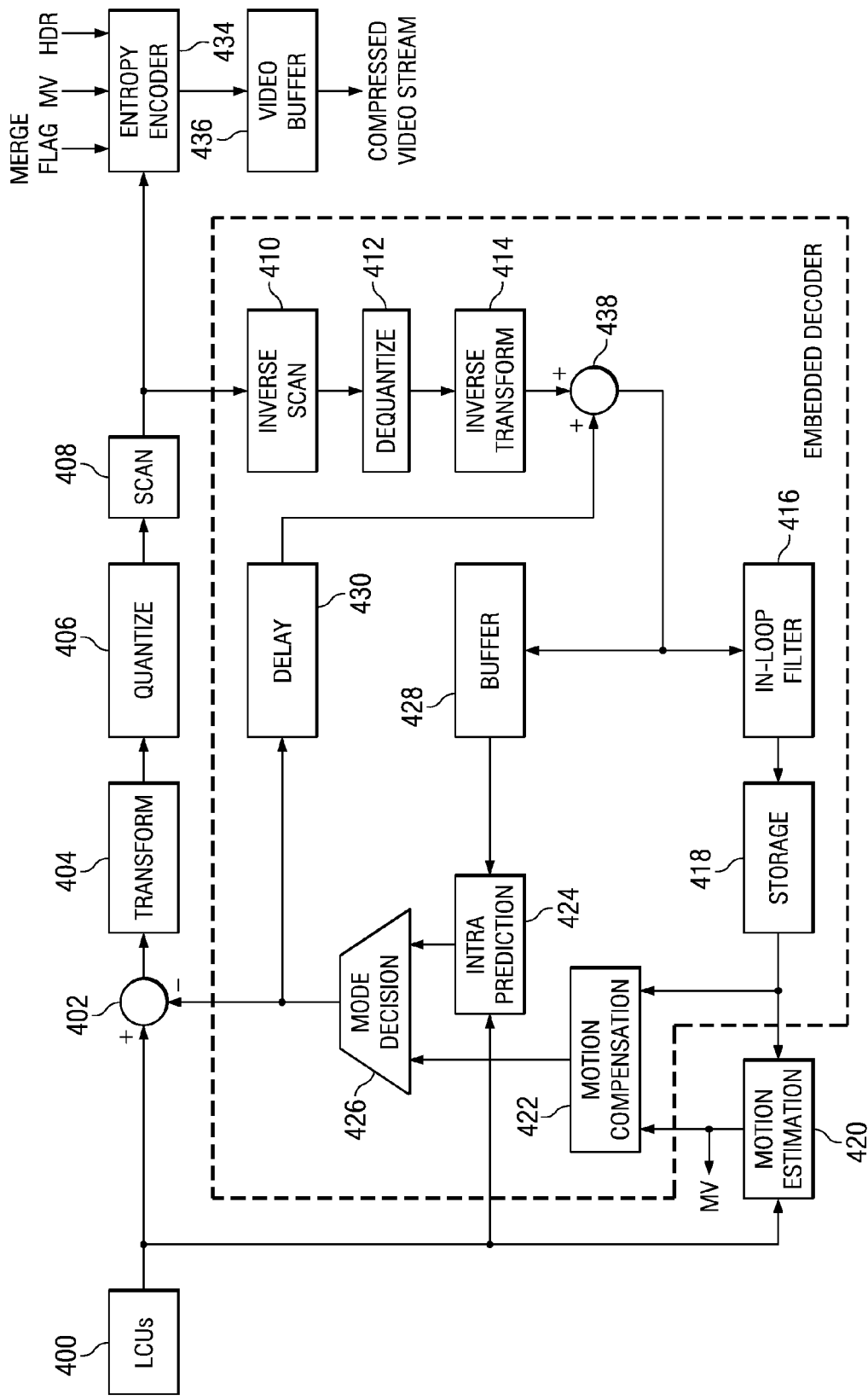
FIG. 4 is a block diagram of a video encoder.

FIG. 4 shows a block diagram of the LCU processing portion of an example video encoder. A coding control component (not shown) sequences the various operations of the LCU processing, i.e., the coding control component runs the main control loop for video encoding. The coding control component receives a digital video sequence and performs any processing on the input video sequence that is to be done at the picture level, such as determining the coding type (I, P, or B) of a picture based on the high level coding structure, e.g., IPPP, IBBP, hierarchical-B, and dividing a picture into LCUs for further processing. The coding control component also may determine the initial LCU CU structure for each CU and provides information regarding this initial LCU CU structure to the various components of the video encoder as needed. The coding control component also may determine the initial PU and TU structure for each CU and provides information regarding this initial structure to the various components of the video encoder as needed.

The LCU processing receives LCUs of the input video sequence from the coding control component and encodes the LCUs under the control of the coding control component to generate the compressed video stream. The CUs in the CU structure of an LCU may be processed by the LCU processing in a depth-first Z-scan order. The LCUs 400 from the coding control unit are provided as one input of a motion estimation component 420, as one input of an intra-prediction component 424, and to a positive input of a combiner 402 (e.g., adder or subtractor or the like). Further, although not specifically shown, the prediction mode of each picture as selected by the coding control component is provided to a mode selector component and the entropy encoder 434.

The storage component 418 provides reference data to the motion estimation component 420 and to the motion compensation component 422. The reference data may include one or more previously encoded and decoded CUs, i.e., reconstructed CUs.

The motion estimation component 420 provides motion estimation information to the motion compensation component 422 and the entropy encoder 434. More specifically, the motion estimation component 420 performs tests on CUs in an LCU based on multiple inter-prediction modes (e.g., skip mode, merge mode, and normal or direct inter-prediction) and transform block sizes using reference data from storage 418 to choose the best motion vector(s)/prediction mode based on a coding cost. To perform the tests, the motion estimation component 420 may begin with the CU structure provided by the coding control component 440. The motion estimation component 420 may divide each CU indicated in the CU structure into PUs according to the unit sizes of prediction modes and into transform units according to the transform block sizes and calculate the coding costs for each prediction mode and transform block size for each CU.

As mentioned above, one of the prediction modes considered by the motion estimation component 420 may be merge mode. Merge mode allows a PU to inherit motion vectors, prediction direction, and reference picture indices from selected candidate PUs. To consider merge mode, the motion estimation component 420 constructs a merging candidate list. The derivation of the candidate PUs to be considered for merging and the criteria for including a merging candidate for a candidate PU in the merging candidate list may be defined by the video coding standard followed by the encoder. Examples of candidate PUs and merging candidate list construction criteria may be found in WD2 and in B. Bross, et al., "High Efficiency Video Coding (HEVC) Text Specification Draft 6, JCTVC-H1003, Joint Collaborative Team on Video Coding (JCT-VC) of ITU-T SG16 WP3 and ISO/IEC JTC1/SC29/WG1, Geneva, CH, Nov. 21-30, 2011 ("HEVC Draft 6"), which is incorporated by reference herein.

In some embodiments, if the merging candidate list is empty after all candidate PUs are considered, a zero motion vector merging candidate is added to the merging candidate list. In some embodiments, if the merging candidate list has fewer entries than a maximum number of entries permitted, sufficient zero motion vector merging candidates are added to the merging candidate list to create a merging candidate list with the maximum number of entries. In a merging candidate for a forward predicted candidate PU, the prediction flag is set to indicate forward prediction, the forward motion vector is set to the motion vector of the PU, and the forward reference picture index is set to the reference picture index for the PU. The remaining entries in the merging candidate may have placeholder values, e.g., a value of 0. In a merging candidate for a bi-directionally predicted candidate PU, the prediction flag is set to indicate bi-directional prediction, the forward motion vector is set to the forward motion vector of the PU, the backward motion vector is set to the backward motion vector of the PU, the forward reference picture index is set to the forward reference picture index for the PU, and the backward reference picture index is set to the backward reference picture index for the PU.

A zero motion vector merging candidate may include the same number of entries as a merging candidate and may be formatted as follows. If the current slice, i.e., the slice containing the current PU, is a forward predicted slice, i.e., a P slice, the zero motion vector merging candidate is formatted as follows: the prediction flag is set to indicate forward prediction, the forward motion vector is set to zero, and the forward reference picture index is set to zero. The remaining entries may set to any suitable placeholder value or may also be set to zero. In some embodiments, the forward prediction list utilization flag of the prediction flag entry is set to 1 and the backward prediction list utilization flag is set to −1 to indicate forward prediction. Other values for these flags may be used as long as the combination of values is distinct from that used to indicate bi-directional prediction.

If the current slice is a bi-directionally predicted slice, i.e., a B slice, the zero motion vector merging candidate is formatted as follows: the prediction flag is set to indicate bidirectional prediction, the forward motion vector and the backward motion vector are set to zero, and the forward and backward reference picture indices are set to zero. In some embodiments, the prediction utilization flags of the prediction flag entry are both set to 1 to indicate bi-directional prediction. Other values for these flags may be used as long as the combination of values is distinct from that used to indicate forward prediction.

The motion estimation component 420 computes coding costs for each entry in the merging candidate list and selects the entry with the best result. The coding cost of this entry is used by the motion estimation component 420 in prediction mode selection.

In general, for normal intra-prediction mode, the motion estimation component 420 constructs an AMVP candidate list used for differentially encoding motion vectors determined in the normal mode, determines the best motion vectors and MVP from the AMVP candidate list based on coding costs, and uses the best coding cost for prediction mode selection. Examples of normal inter-prediction and construction of the AMVP candidate list may be found in WD2 and HEVC Draft 6.

For coding efficiency, the motion estimation component 420 may also decide to alter the CU structure by further partitioning one or more of the CUs in the CU structure. That is, when choosing the best motion vectors/prediction modes, in addition to testing with the initial CU structure, the motion estimation component 420 may also choose to divide the larger CUs in the initial CU structure into smaller CUs (within the limits of the recursive quadtree structure), and calculate coding costs at lower levels in the coding hierarchy. If the motion estimation component 420 changes the initial CU structure, the modified CU structure is communicated to other components in the LCU processing component 442 that need the information.

The motion estimation component 420 provides the selected motion vector (MV) or vectors and the selected prediction mode for each inter-predicted PU of a CU to the motion compensation component 422 and the selected motion vector (MV) to the entropy encoder 434. If merge mode provides the best motion vector(s)/prediction mode for a PU based on a coding cost, the motion estimation component 420 also indicates to the entropy encoder 434 to encode a merge flag indicating that merge mode is used for a PU and to encode an index into the merging candidate list for the entry that provided the best coding cost. The index may not be encoded if the merge merging candidate list size is one. If merge mode did not provide the best coding cost for an inter-predicted PU, the motion estimation component 420 indicates to the entropy encoder 434 to encode a merge flag indicating that merge mode was not used for the PU. A merge flag is encoded for each inter-predicted PU unless skip mode or intra-prediction mode is selected.

Note that the merging candidate list is not allowed to be empty. If no viable merging candidate is found from the candidate PUs during the construction of the merging candidate list, there will be at least one zero motion vector merging candidate in the merging candidate list. The merge flag will be encoded in the bit stream if the mode decision component 426 selects inter-prediction for a PU and the PU is not coded using skip mode, and an index into the merging candidate list, if the merge merging candidate list size larger than one, will be encoded in the bit stream if merge mode is selected for a PU and the mode decision component 426 selects inter-prediction for the PU.

The motion compensation component 422 provides motion compensated inter-prediction information to the mode decision component 426 that includes motion compensated inter-predicted PUs, the selected inter-prediction modes for the inter-predicted PUs, and corresponding transform block sizes. The coding costs of the inter-predicted PUs are also provided to the mode decision component 426.

The intra-prediction component 424 provides intra-prediction information to the mode decision component 426 that includes intra-predicted PUs and the corresponding intra-prediction modes. That is, the intra-prediction component 424 performs intra-prediction in which tests based on multiple intra-prediction modes and transform unit sizes are performed on CUs in an LCU using previously encoded neighboring PUs from the buffer 428 to choose the best intra-prediction mode for each PU in the CU based on a coding cost. To perform the tests, the intra-prediction component 424 may begin with the CU structure provided by the coding control component 440. The intra-prediction component 424 may divide each CU indicated in the CU structure into PUs according to the unit sizes of the intra-prediction modes and into transform units according to the transform block sizes and calculate the coding costs for each prediction mode and transform block size for each PU.

For coding efficiency, the intra-prediction component 424 may also decide to alter the CU structure by further partitioning one or more of the CUs in the CU structure. That is, when choosing the best prediction modes, in addition to testing with the initial CU structure, the intra-prediction component 424 may also chose to divide the larger CUs in the initial CU structure into smaller CUs (within the limits of the recursive quadtree structure), and calculate coding costs at lower levels in the coding hierarchy. If the intra-prediction component 424 changes the initial CU structure, the modified CU structure is communicated to other components in the LCU processing component 442 that need the information. Further, the coding costs of the intra-predicted PUs and the associated transform block sizes are also provided to the mode decision component 426.

The mode decision component 426 selects between the motion-compensated inter-predicted PUs from the motion compensation component 422 and the intra-predicted PUs from the intra-prediction component 424 based on the coding costs of the PUs and the picture prediction mode provided by the mode selector component. The output of the mode decision component 426, i.e., the predicted PU, is provided to a negative input of the combiner 402 and to a delay component 430. The associated transform block size is also provided to the transform component 404. The output of the delay component 430 is provided to another combiner (i.e., an adder) 438. The combiner 402 subtracts the predicted PU from the current PU to provide a residual PU to the transform component 404. The resulting residual PU is a set of pixel difference values that quantify differences between pixel values of the original PU and the predicted PU.

The transform component 404 performs block transforms on the residual PUs to convert the residual pixel values to transform coefficients and provides the transform coefficients to a quantize component 406. The transform component 404 receives the transform block sizes for the residual PUs and applies transforms of the specified sizes to the PUs to generate transform coefficients.

The quantize component 406 quantizes the transform coefficients based on quantization parameters (QPs) and quantization matrices provided by the coding control component and the transform sizes. The quantized transform coefficients are taken out of their scan ordering by a scan component 408 and arranged by significance, such as, for example, beginning with the more significant coefficients followed by the less significant.

The ordered quantized transform coefficients for a PU provided via the scan component 408 along with header information for the PU are coded by the entropy encoder 434, which provides a compressed bit stream to a video buffer 436 for transmission or storage. The header information may include the prediction mode used for the PU. If the PU is inter-predicted, a merge flag is encoded for the PU unless skip mode is indicated. Further, if merge mode is the actual mode selected for prediction of the PU, an index into the merging candidate list for the merging candidate used for prediction of the PU is also encoded unless the size of the merging candidate list is one. The entropy encoder 434 also encodes the CU and PU structure of each LCU.

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures. To determine the reconstructed input, i.e., reference data, the ordered quantized transform coefficients for a PU provided via the scan component 408 are returned to their original post-transform arrangement by an inverse scan component 410, the output of which is provided to a dequantize component 412, which outputs a reconstructed version of the transform result from the transform component 404.

The dequantized transform coefficients are provided to the inverse transform component 414, which outputs estimated residual information which represents a reconstructed version of a residual PU. The inverse transform component 414 receives the transform block size used to generate the transform coefficients and applies inverse transform(s) of the specified size to the transform coefficients to reconstruct the residual values.

The reconstructed residual PU is provided to the combiner 438. The combiner 438 adds the delayed selected PU to the reconstructed residual PU to generate an unfiltered reconstructed PU, which becomes part of reconstructed picture information. The reconstructed picture information is provided via a buffer 428 to the intra-prediction component 424 and to an in-loop filter component 416. The in-loop filter component 416 applies various filters to the reconstructed picture information to improve the reference picture used for encoding/decoding of subsequent pictures. The in-loop filter component 416 may, for example, adaptively apply low-pass filters to block boundaries according to the boundary strength to alleviate blocking artifacts causes by the block-based video coding. The filtered reference data is provided to storage component 418.

Figure 5:
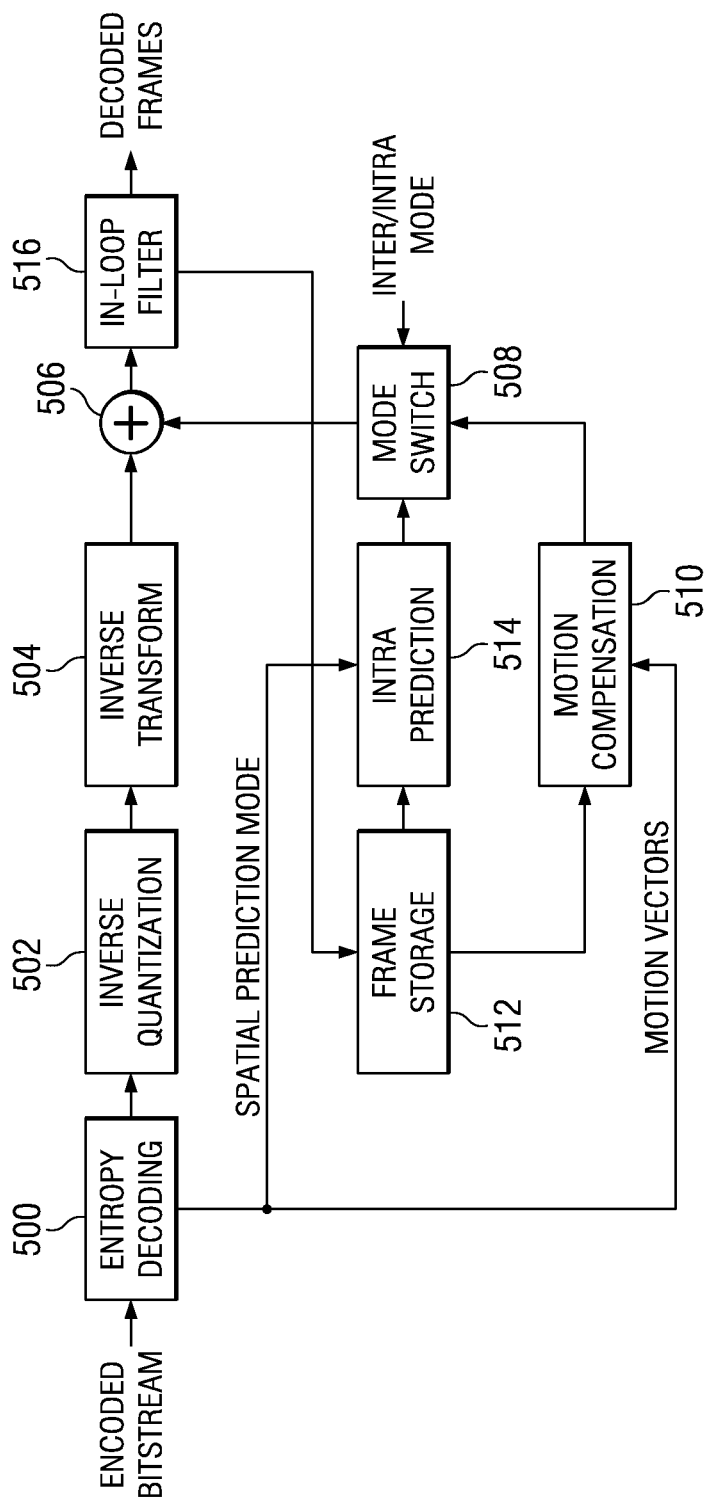
FIG. 5 is a block diagram of a video decoder.

FIG. 5 shows a block diagram of an example video decoder. The video decoder operates to reverse the encoding operations, i.e., entropy coding, quantization, transformation, and prediction, performed by the video encoder of FIG. 4 to regenerate the pictures of the original video sequence. In view of the above description of a video encoder, one of ordinary skill in the art will understand the functionality of components of the video decoder without detailed explanation.

The entropy decoding component 500 receives an entropy encoded (compressed) video bit stream and reverses the entropy coding to recover the encoded PUs and header information such as the prediction modes and the encoded CU and PU structures of the LCUs, merge flags, merge indices, etc. For each inter-predicted PU, unless skip mode is indicated, the entropy decoding component 500 decodes a merge flag from the bit stream. If the merge flag indicates that merge mode was not selected for the PU, the entropy decoding component 500 constructs an AMVP candidate list for the PU and decodes a reference picture index (or indices), MVDs, and an index into the AMVP candidate list for the PU. The entropy decoder 500 then reconstructs the motion vector(s) according to the indicated AMVP candidate and the decoded MVDs and provides the motion vector(s) to the motion compensation component 510.

If the merge flag indicates that merge mode was used for the PU in the encoder, the entropy decoding component 500 constructs a merging candidate list for the PU and decodes an index into the merging candidate list from the bit stream, if the index is in the bit stream. If no index is present, the index is assumed to be zero. Construction of the merging candidate list is previously described in reference to the encoder of FIG. 4. The entropy decoder provides the motion vector(s) from the indicated merging candidate in the merging candidate list to the motion compensation component 510.

The inverse quantization component 502 de-quantizes the quantized transform coefficients of the residual PUs. The inverse transform component 504 transforms the frequency domain data from the inverse quantization component 502 back to residual PUs. That is, the inverse transform component 504 applies an inverse unit transform, i.e., the inverse of the unit transform used for encoding, to the de-quantized residual coefficients to produce the residual PUs.

A residual PU supplies one input of the addition component 506. The other input of the addition component 506 comes from the mode switch 508. When an inter-prediction mode is signaled in the encoded video stream, the mode switch 508 selects a PU from the motion compensation component 510 and when an intra-prediction mode is signaled, the mode switch selects a PU from the intra-prediction component 514.

The motion compensation component 510 receives reference data from storage 512 and applies the motion compensation computed by the encoder and transmitted in the encoded video bit stream to the reference data to generate a predicted PU. That is, the motion compensation component 510 uses the motion vector(s) from the entropy decoder 500 and the reference data to generate a predicted PU.

The intra-prediction component 514 receives reference data from previously decoded PUs of a current picture from the picture storage and applies the intra-prediction computed by the encoder as signaled by the intra-prediction mode transmitted in the encoded video bit stream to the reference data to generate a predicted PU.

The addition component 506 generates a decoded PU by adding the predicted PU selected by the mode switch 508 and the residual PU. The output of the addition component 506 supplies the input of the in-loop filter component 516. The in-loop filter component 516 performs the filtering as the encoder. The output of the in-loop filter component 516 is the decoded pictures of the video bit stream. Further, the output of the in-loop filter component 516 is stored in storage 512 to be used as reference data.

Figure 6:
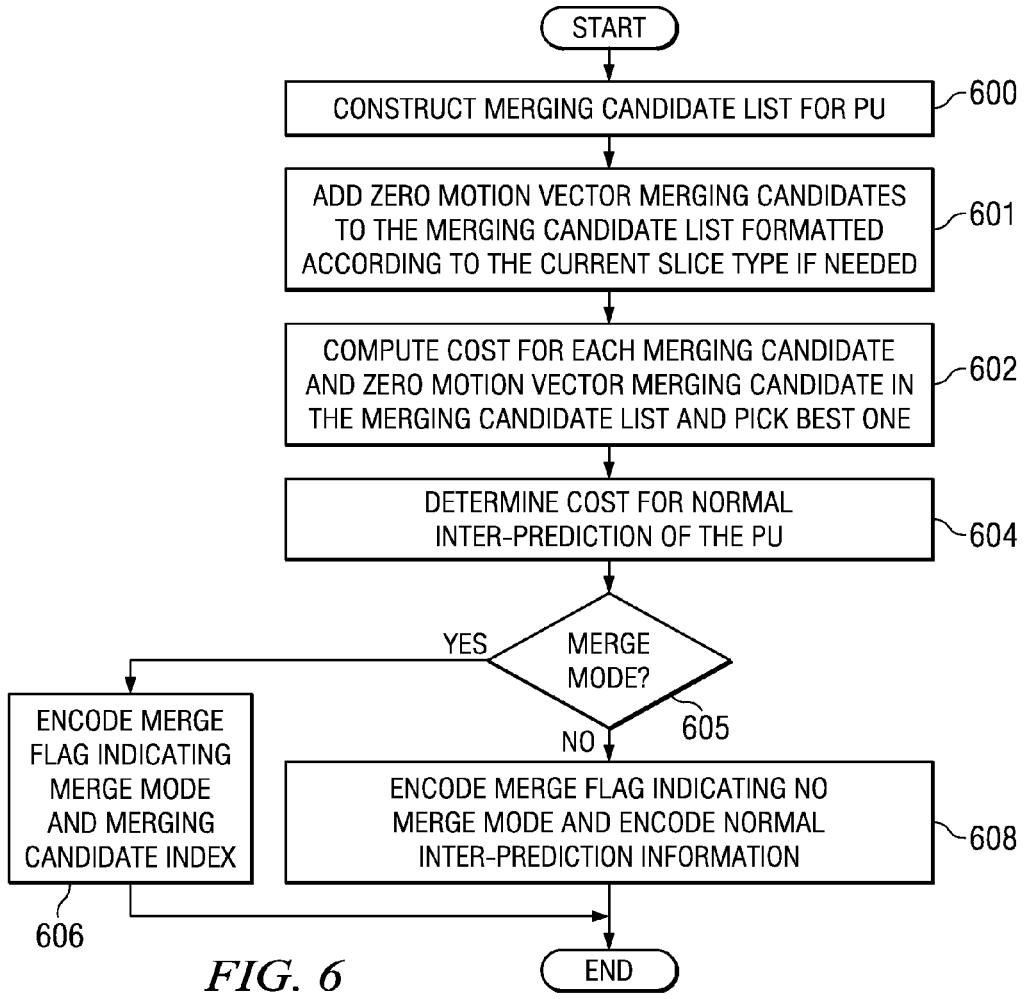
FIG. 6 is a flow diagram of a method for inter-prediction of a PU using merge mode.
Figure 8:
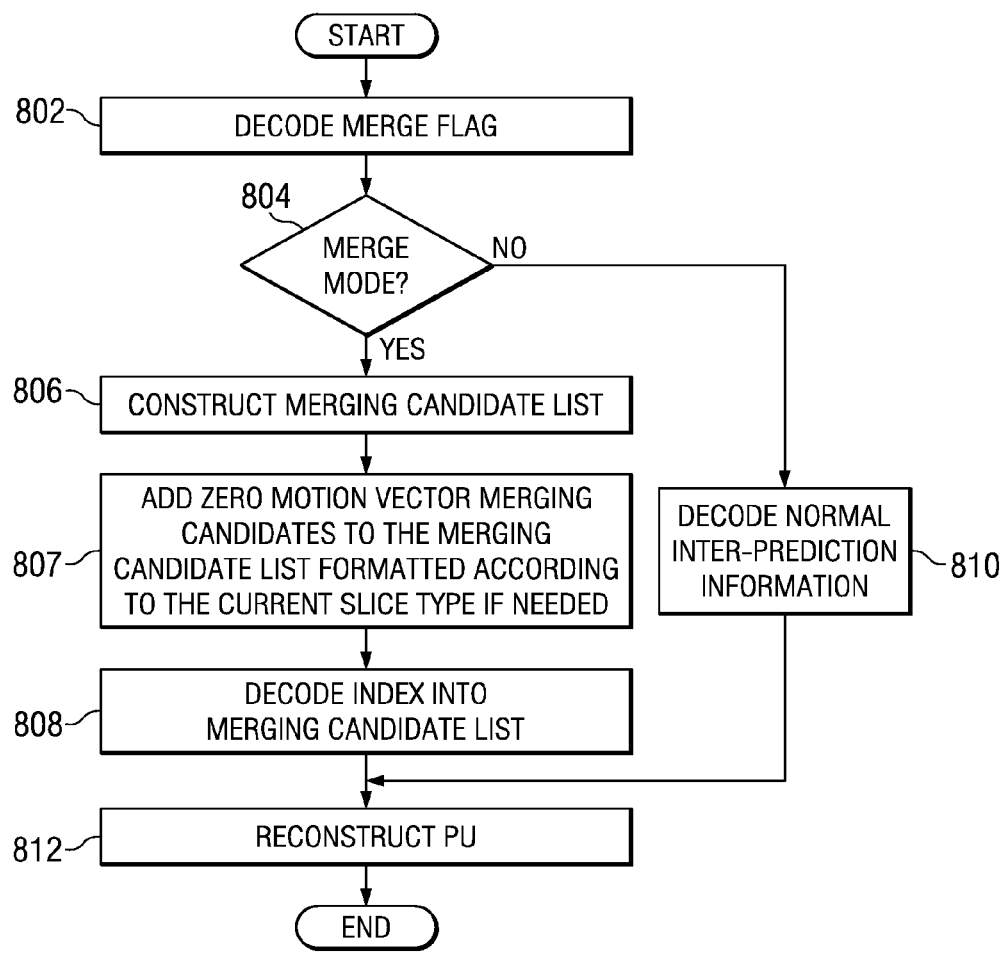
FIG. 8 is a flow diagram of a method for decoding an inter-predicted PU.

FIG. 6 shows a flow diagram illustrating a method for inter-prediction of a PU in a video encoder and FIG. 8 shows a flow diagram illustrating a method for decoding an inter-predicted PU in a video decoder. Although the method steps may be presented and described herein in a sequential fashion, one or more of the steps shown and described may be performed concurrently, may be combined, and/or may be performed in a different order than the order shown in the figures and/or described herein. Accordingly, embodiments should not be considered limited to the specific ordering of steps shown in the figures and/or described herein.

Figure 7:
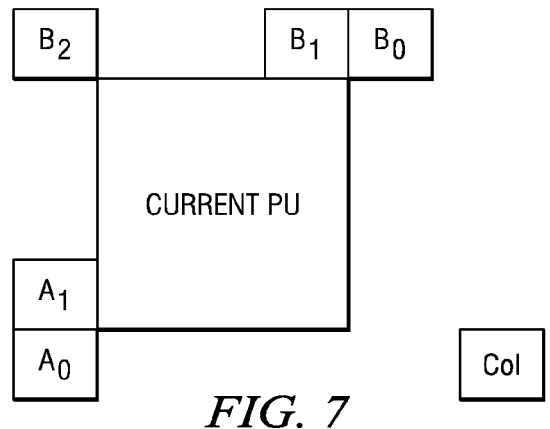
FIG. 7 shows an example of candidate PUs for merge mode.

Referring first to FIG. 6, initially, a merging candidate list is constructed 600 for the PU as part of motion estimation in the video encoder. The construction of the merging candidate list is performed as per the video coding standard followed by the encoder. That is, the derivation of the candidate PUs to be considered for merging and the criteria for adding a merging candidate of a candidate PU to the merging candidate list are defined by the video coding standard. Examples of candidate PUs and merging candidate list construction criteria may be found in WD2 and HEVC Draft 6. FIG. 1 and FIG. 7 illustrate some example candidate PUs. FIG. 1 is previously described herein. In FIG. 7, the candidate spatially neighboring PUs are a bottom left neighboring PU ($A_0$), a left neighboring PU ($A_1$), a right top neighboring PU ($B_0$), a top neighboring PU ($B_1$), and a left top neighboring PU ($B_2$). A temporally co-located PU (Col) is also a candidate PU. The derivation of the location of the temporally co-located PU is defined in HEVC Draft 6.

One or more zero motion vector merging candidates formatted according to the current slice type are added 601 to the merging candidate list if needed. In some embodiments, if the merging candidate list is empty after all the candidate PUs are considered, a zero motion vector merging candidate is added to the merging candidate list to ensure that the list is not empty. In some embodiments, if the number of merging candidates in the merging candidate list is less than a maximum number of merging candidates, sufficient zero motion vector merging candidates are added to the merging candidate list to create a merging candidate list with the maximum number of merging candidates permitted. The maximum number of merging candidates may be user specified, may be specified by the video coding standard, may be both user specified and limited by the standard, etc. The format of the added zero motion vector merging candidates may be dependent on the prediction type of the current slice. Slice type dependent formatting of a zero motion vector merging candidate is previously described herein.

The coding cost for each merging candidate (and zero motion vector merging candidate, if present) in the merging candidate list is computed 602 and the entry providing the best result is selected for merge mode. Computation of coding cost may be specified by the video coding standard in use. A coding cost for normal inter-prediction of the PU is also determined 604. Normal inter-prediction may be specified by the video coding standard in use.

A determination 605 is made as to whether or not merge mode is to be used for prediction of the PU. Merge mode may be used if it provides the best coding cost as compared to normal inter-prediction and intra-prediction. If merge mode is selected 605, a merge flag is encoded 606 in the encoded bit stream with a value indicating that merge mode was used for the PU unless the merging candidate list size is one. The index of the entry in the merging candidate list used for predicting the PU is also encoded in the encoded bit stream unless the merge merging candidate list size is one. An index of 0 denotes the first entry in the merging candidate list. If merge mode is not selected 605 (and the PU is inter-predicted), the merge flag is encoded 608 in the encoded bit stream with a value indicating that merge mode was not used for the PU, and the normal inter-prediction information for the PU is encoded in the bit stream.

Referring now to FIG. 8, to decode an inter-coded PU, initially the merge flag for the PU is decoded 802 from the encoded bit stream. A determination 804 is then made as to whether or not merge mode was used to encode the PU. If merge mode was used 804, a merging candidate list is constructed 806 for the PU. The construction of the merging candidate list is performed as per the video coding standard followed by the encoder used to encode the bit stream. That is, the derivation of the candidate PUs to be considered for merging and the criteria for adding a merging candidate of a candidate PU to the merging candidate list are defined by the video coding standard. Examples of candidate PUs and merging candidate list construction criteria may be found in WD2 and HEVC Draft 6. FIG. 1 and FIG. 7 illustrate some example candidate PUs and are previously described herein.

As in the encoder, one or more zero motion vector merging candidates formatted according to the current slice type may be added 807 to the merging candidate list if needed. In some embodiments, if the merging candidate list is empty after all the candidate PUs are considered, a zero motion vector merging candidate is added to the merging candidate list to ensure that the list is not empty. In some embodiments, if the number of merging candidates in the merging candidate list is less than a maximum number of merging candidates, sufficient zero motion vector merging candidates are added to the merging candidate list to create a merging candidate list with the maximum number of merging candidates. The maximum number of merging candidates may be user specified, may be specified by the video coding standard, may be both user specified and limited by the standard, etc. The format of the added zero motion vector merging candidates may be dependent on the prediction type of the current slice. Slice type dependent formatting of a zero motion vector merging candidate is previously described herein.

The index into merging candidate list of the entry used for inter-prediction of the PU is also decoded 808. If the merge merging candidate list size is one, the index may not be present in the bit stream and is inferred to 0 by the decoder. The PU is then reconstructed 812 using the merging candidate (or zero motion vector merging candidate) indicated by the index.

If merge mode was not used 804, the normal intra-prediction information for the PU is decoded 810 from the bit stream and the PU is reconstruction 812 using this information.

Figure 9:
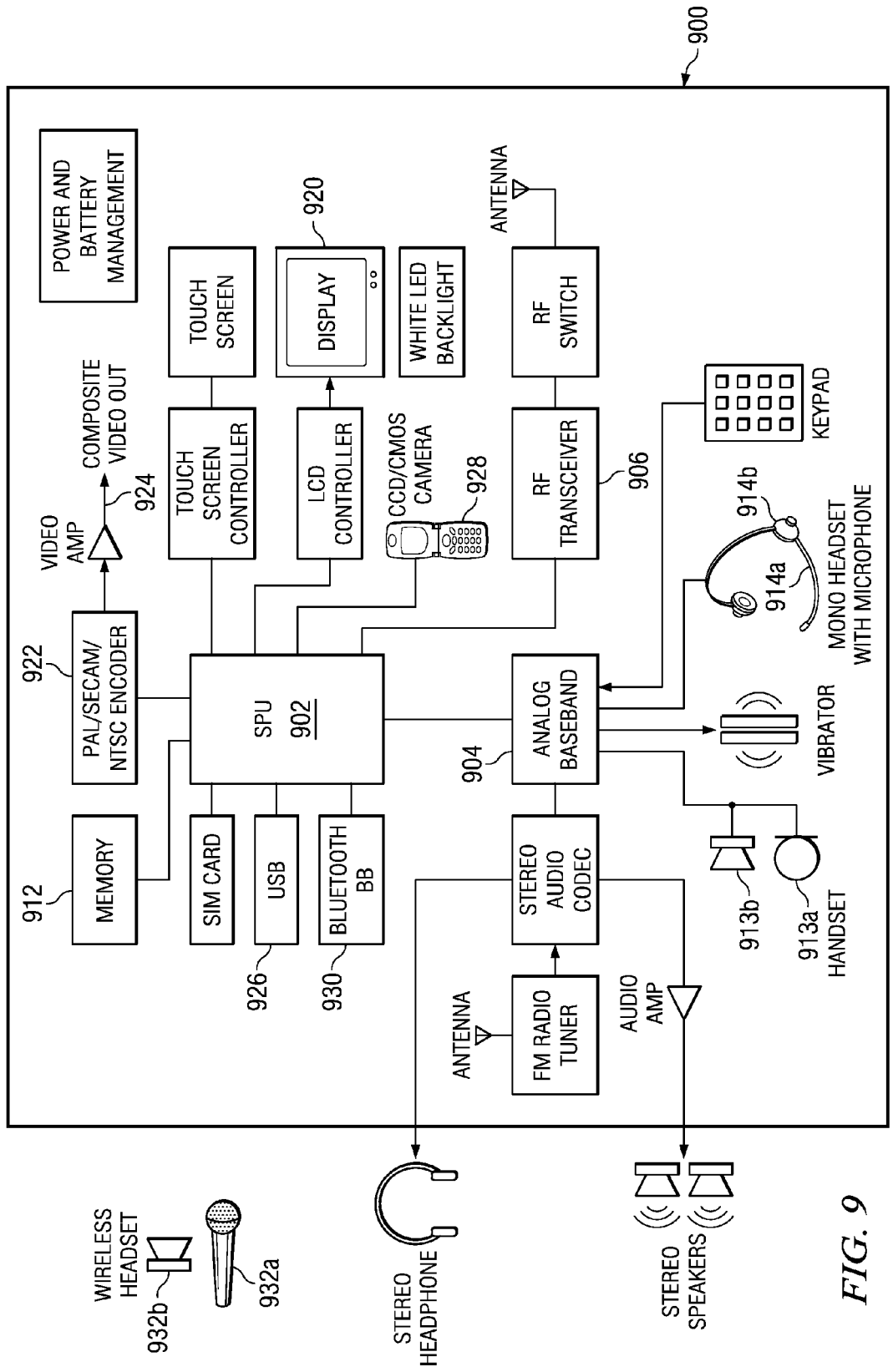
FIG. 9 is a block diagram of an illustrative digital system.

Embodiments of the methods, encoders, and decoders described herein may be implemented for virtually any type of digital system (e.g., a desk top computer, a laptop computer, a tablet computing device, a netbook computer, a handheld device such as a mobile (i.e., cellular) phone, a personal digital assistant, a digital camera, a set top box, a digital video recorder, etc.). FIG. 9 is a block diagram of a digital system 900 (e.g., a mobile cellular telephone) that may be configured to use techniques described herein.

As shown in FIG. 9, the signal processing unit (SPU) 902 includes a digital signal processing system (DSP) that includes embedded memory and security features. The analog baseband unit 904 receives a voice data stream from the handset microphone 913a and sends a voice data stream to the handset mono speaker 913b. The analog baseband unit 904 also receives a voice data stream from the microphone 914a or 932a and sends a voice data stream to the mono headset 914b or wireless headset 932b. The analog baseband unit 904 and the SPU 902 may be separate ICs. In many embodiments, the analog baseband unit 904 does not embed a programmable processor core, but performs processing based on configuration of audio paths, filters, gains, etc being setup by software running on the SPU 902.

The display 920 may display pictures and video sequences received from a local camera 928, or from other sources such as the USB 926 or the memory 912. The SPU 902 may also send a video sequence to the display 920 that is received from various sources such as the cellular network via the RF transceiver 906 or the Bluetooth interface 930. The SPU 902 may also send a video sequence to an external video display unit via the encoder unit 922 over a composite output terminal 924. The encoder unit 922 may provide encoding according to PAL/SECAM/NTSC video standards.

The SPU 902 includes functionality to perform the computational operations required for video encoding and decoding. In one or more embodiments, the SPU 902 is configured to perform computational operations for applying one or more techniques for PU inter-prediction during the encoding process as described herein. Software instructions implementing all or part of the techniques may be stored in the memory 912 and executed by the SPU 902, for example, as part of encoding video sequences captured by the local camera 928. The SPU 902 is also configured to perform computational operations for applying one or more techniques for decoding of inter-predicted PUs as described herein as part of decoding a received coded video sequence or decoding a coded video sequence stored in the memory 912. Software instructions implementing all or part of the techniques may be stored in the memory 912 and executed by the SPU 902.

OTHER EMBODIMENTS

While the invention has been described with respect to a limited number of embodiments, those skilled in the art, having benefit of this disclosure, will appreciate that other embodiments can be devised which do not depart from the scope of the invention as disclosed herein.

For example, in an embodiment, the decoding of the merge flag and the construction of the merging candidate list may be performed concurrently or in parallel as the decoding of the merge flag is not conditioned on the size of the merging candidate list as in HM2.0.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A system for encoding a video stream in a video encoder to generate an encoded bit stream, the system comprising:
   a coding control component configured to receive a picture from the video stream;
   a motion estimation component coupled to the coding control component and configured to construct a merge mode motion data vector (merging candidate) list for a prediction unit (PU) and add a zero motion vector merging candidate to the merging candidate list, wherein content of the zero motion vector merging candidate is determined based on a prediction type of a slice containing the PU; and
   an entropy encoder component coupled to the motion estimation component and configured to encode a merge flag for the PU in the encoded bit stream, wherein the merge flag is set to a first value indicating merge mode if merge mode is used for inter-prediction of the PU and the merge flag is set to a second value indicating no merge mode if merge mode is not used for inter-prediction of the PU and a merge flag is always encoded in the encoded bit stream for each inter-predicted PU that is not encoded using skip mode.

2. The system of claim 1, the motion estimation component further configured to set, for the zero motion vector merging candidate, a motion vector with a value of zero if the slice is a forward predicted slice, and set two motion vectors with values of zero if the slice is a bi-directionally predicted slice.

3. The system of claim 2, the motion estimation component further configured to set both a first prediction list utilization flag and a second prediction list utilization flag to one when the slice is a bi-directionally predicted slice.

4. The system of claim 1 wherein the coding control component, the motion estimation component and the entropy encoder component are all implemented in a signal processing unit that comprises a processor and embedded memory.

5. The system of claim 1 wherein the coding control component, the motion estimation component, and the entropy encoder component are all implemented in a system comprising a software program being executed in one or more processors wherein the software program is stored in a memory and loaded from the memory into the one or more processors prior to being executed by the one or more processors.

6. The system of claim 4 wherein the signal processing unit is further coupled to a second memory.

7. The system of claim 6 wherein the coding control component, the motion estimation component and the entropy encoder component are all implemented in a signal processing unit that is further coupled to a video camera.

8. The system of claim 7 wherein the signal processing unit is further coupled to an analog baseband that is coupled to an antenna.

9. A system for decoding an encoded video bit stream in a video decoder, the system comprising:
   an entropy decoding component configured to:
   decode a merge flag for a inter-predicted prediction unit (PU) from the encoded bit stream;
   construct a merge mode motion data vector (merging candidate) list for the inter-predicted PU;
   add a zero motion vector merging candidate to the merging candidate list, wherein content of the zero motion vector merging candidate is determined based on a prediction type of a slice containing the inter-predicted PU;
   an inverse quantization component coupled to the entropy decoding component and configured to de-quantize quantized transform coefficients of residual prediction units decoded from the encoded bit stream;
   an inverse transform component coupled to the inverse quantization component and configured to inverse transform the transform coefficients of residual prediction units from the inverse quantization component from a frequency domain to residual prediction units;
   a motion compensation component coupled to the entropy decoding component and configured to form reconstructed prediction units; and
   an adder component coupled to the motion compensation component and the inverse transform component and configured to combine residual prediction units and reconstructed prediction units.

10. The system of claim 9, the entropy decoding component further configured to set, for the zero motion vector merging candidate, a motion vector with a value of zero if the slice is a forward predicted slice, and set two motion vectors with values of zero if the slice is a bi-directionally predicted slice.

11. The system of claim 9 wherein the entropy decoding component, the inverse quantization component, the inverse transform component, the motion estimation component, and the adder component are all implemented in a signal processing unit that comprises a processor and embedded memory.

12. The system of claim 9 wherein the entropy decoding component, the inverse quantization component, the inverse transform component, the motion estimation component, and the adder component are all implemented in a system comprising a software program being executed in one or more processors wherein the software program is stored in a memory and loaded from the memory into the one or more processors prior to being executed by the one or more processors.

13. The system of claim 11 wherein the entropy decoding component, the inverse quantization component, the inverse transform component, the motion estimation component, and the adder component are all implemented in a signal processing unit that is further coupled to a second memory.

14. The system of claim 13 wherein the signal processing unit and the memory are further coupled to a display.

15. A video system for an encoded video bit stream, comprising:
- an entropy decoding component configured to:
- decode a merge flag for a inter-predicted prediction unit (PU) from the encoded bit stream;
- construct a merge mode motion data vector (merging candidate) list for the inter-predicted PU;
- add a zero motion vector merging candidate to the merging candidate list, wherein content of the zero motion vector merging candidate is determined based on a prediction type of a slice containing the inter-predicted PU;
- an inverse quantization component coupled to the entropy decoding component and configured to de-quantize quantized transform coefficients of residual prediction units decoded from the encoded bit stream;
- an inverse transform component coupled to the inverse quantization component and configured to inverse transform the transform coefficients of residual prediction units from the inverse quantization component from a frequency domain to residual prediction units;
- a motion compensation component coupled to the entropy decoding component and configured to form reconstructed prediction units;
- an adder component coupled to the motion compensation component and the inverse transform component and configured to combine residual prediction units and reconstructed prediction units;
- a memory coupled to the adder component and configured to store a picture; and
- a display coupled to the memory to display the picture.

16. The system of claim 15, the entropy decoding component further configured to set, for the zero motion vector merging candidate, a motion vector with a value of zero if the slice is a forward predicted slice, and set two motion vectors with values of zero if the slice is a bi-directionally predicted slice.

17. The system of claim 15 wherein the entropy decoding component, the inverse quantization component, the inverse transform component, the motion estimation component, and the adder component are all implemented in a signal processing unit that comprises a processor and embedded memory.

18. The system of claim 15 wherein the entropy decoding component, the inverse quantization component, the inverse transform component, the motion estimation component, and the adder component are all implemented in a system comprising a software program being executed in one or more processors wherein the software program is stored in a memory and loaded from the memory into the one or more processors prior to being executed by the one or more processors.

* * * * *